United States Patent [19]

Kunishima et al.

[11] Patent Number: 4,768,100
[45] Date of Patent: Aug. 30, 1988

[54] IMAGE PROCESSING APPARATUS

[75] Inventors: Toshiaki Kunishima; Takeshi Ikeda, both of Yokohama; Michio Kasuya, Fuchu; Hiroaki Matsumoto; Masakatsu Iwata, both of Yokohama, all of Japan

[73] Assignee: Canon Kabushiki Kaisha, Tokyo, Japan

[21] Appl. No.: 628,854

[22] Filed: Jul. 9, 1984

[30] Foreign Application Priority Data

| Jul. 22, 1983 | [JP] | Japan | 58-132799 |
| Jul. 22, 1983 | [JP] | Japan | 58-132800 |
| Jul. 22, 1983 | [JP] | Japan | 58-132801 |
| Jul. 22, 1983 | [JP] | Japan | 58-123802 |
| Jul. 22, 1983 | [JP] | Japan | 58-123803 |
| Aug. 3, 1983 | [JP] | Japan | 58-142063 |

[51] Int. Cl.$^4$ .................................................. H04N 1/04
[52] U.S. Cl. ................................... 358/285; 358/286; 358/293; 358/298
[58] Field of Search ............... 358/285, 286, 256, 293, 358/298; 355/145 H

[56] References Cited

U.S. PATENT DOCUMENTS

| 3,845,239 | 10/1974 | Granzow et al. | 358/286 |
| 4,275,423 | 6/1981 | Takahashi | 358/298 |
| 4,442,459 | 4/1984 | Fukui et al. | 358/286 |
| 4,442,460 | 4/1984 | Kurata | 358/293 |
| 4,449,152 | 5/1984 | Kurata et al. | 358/293 |
| 4,476,496 | 10/1984 | Thaler | 358/293 |

FOREIGN PATENT DOCUMENTS

| 57-101472 | 6/1982 | Japan | 358/293 |
| 58-9471 | 1/1983 | Japan | 358/286 |

OTHER PUBLICATIONS

E. Hatabe et al, "The MELFAS-510 High-Speed Thermal Printing Facsimile Transceiver", *Mitsubishi Electric Advance*, vol. 9, 9-79, pp. 23-25.

*Primary Examiner*—Edward L. Coles, Sr.
*Attorney, Agent, or Firm*—Fitzpatrick, Cella, Harper & Scinto

[57] ABSTRACT

An image processing apparatus in which the respective functional sections in the apparatus are clearly separated and constituted as units, thereby raising the productivity, and at the same time the maintenance for the reading optical system and for the jam processing of the sheets and the like can be easily performed. The enclosing space for the recording sheets discharged is built inside the casing, and the original base is also used as the cover for the recording system unit, thereby realizing a small and thin sized apparatus. Further, the heat generated from the power source unit and recording head can be easily radiated.

18 Claims, 6 Drawing Sheets

| MODE | PHONE RECEIVER | ORIGINAL | |
|---|---|---|---|
| TRANSMISSION | ON | ON | |
| RECEPTION | ON | OFF | |
| COPY | OFF | ON | |
| MANUAL CUT | OFF | OFF | |

FIG. 6

IMAGE PROCESSING APPARATUS

BACKGROUND OF THE INVENTION

1. Field of the Invention

The present invention relates to an image processing apparatus in which the original feeding system, reading optical system, recording system, power source, wirings, etc., of the apparatus are respectively constituted as the units and those units are combined and arranged, to realize a compact-sized apparatus.

2. Description of the Prior Art

Recently, for image forming apparatuses and image processing apparatuses such as a facsimile, copying machine or the like, the small-sized and light-weight apparatus has been particularly strongly in demand. Therefore, for example, the tray for enclosing the recording papers, originals and other sheet material which are discharged from the image processing apparatus is generally attached to the outside of the machine such that it projects therefrom instead of being built in the main body of the machine, thereby miniaturizing the main body of the machine by the volume corresponding to the tray. However, with such a construction, the main body of the machine can be miniaturized, and the installation space of the machine in use requires additional space equal only to the space occupied by the protruded tray portion. Thus, the actual miniaturization is not sufficiently realized. To be further mentioned with respect to the tray, if the paper is wound like a roll, such as a thermal recording paper which is used in a facsimile or the like, there is the drawback such that it is difficult to sequentially enclose on the conventional rectilinear tray surface since the roll paper has the strong property such that it intends to return to the circular shape. Recently, in particular, there is a tendency such that the outside diameter of the roll paper is made as small as possible while keeping the whole length of the paper in accordance with the demand for miniaturization of the main body of the machine. For this purpose, a method whereby the diameter of the core of the roll paper is made as small as possible is adopted. Thus, it is important that the paper keeps its circular shape and therefore the development of the method of enclosing the paper corresponding to such situation is strongly demanded in association with the miniaturization of the apparatus.

On the other hand, to realize the miniaturization of the apparatus, it is generally necessary to miniaturize the respective sections (respective functional sections) as themselves which constitute the apparatus, and at the same time it is also necessary to consider carefully and in detail the coupling and correspondence among these respective functional sections and the relation in arrangement thereof. Particularly, this tendency is fairly strong in precision equipment such as image forming apparatus, and the management of a high degree of accuracy in dimensions of each section of the apparatus which is required in association with the miniaturization is one of the difficult problems in realizing miniature of the apparatus. Also, with a decrease in size, the space which each member occupies becomes small, so that there is a tendency for productivity and maintenance to become difficult.

Especially, the maintenance of the reading optical system which is located inside the apparatus is difficult and conventionally, the maintenance can be performed only when various kinds of members are removed, so that the maintenance of such a system becomes the extremely troublesome. In addition, in miniature apparatus, the space which each member occupies becomes small and the adjacent parts approach each other, so that the heat radiation is not efficiently performed in the apparatus which is provided with a recording head having heating elements.

On the other hand, since the electronic parts such as capacitors and connectors are standardized, the dimensions of these parts also hinder size reduction. Namely, where the heights of the electronic parts which are installed on the printed wiring board in which the wirings of the electronic circuit are formed by a print are high, it is impossible to decrease the distance between the printed wiring board and other member, e.g., a chassis, so that the vertical height cannot be made small, and the like.

SUMMARY OF THE INVENTION

It is the first object of the present invention to reduce the size of the apparatus and make it thin.

The second object of the invention is to raise the productivity by constituting the apparatus as the units, thereby realizing easy maintenance of each unit.

The third object of the invention is to realize easy thermal radiation of the power source unit and recording head.

DETAILED DESCRIPTION OF THE PREFERRED EMBODIMENTS

An embodiment in which the present invention was applied to a facsimile apparatus using a thermal recording paper like a roll shape as a recording paper will now be described.

Figure 1:
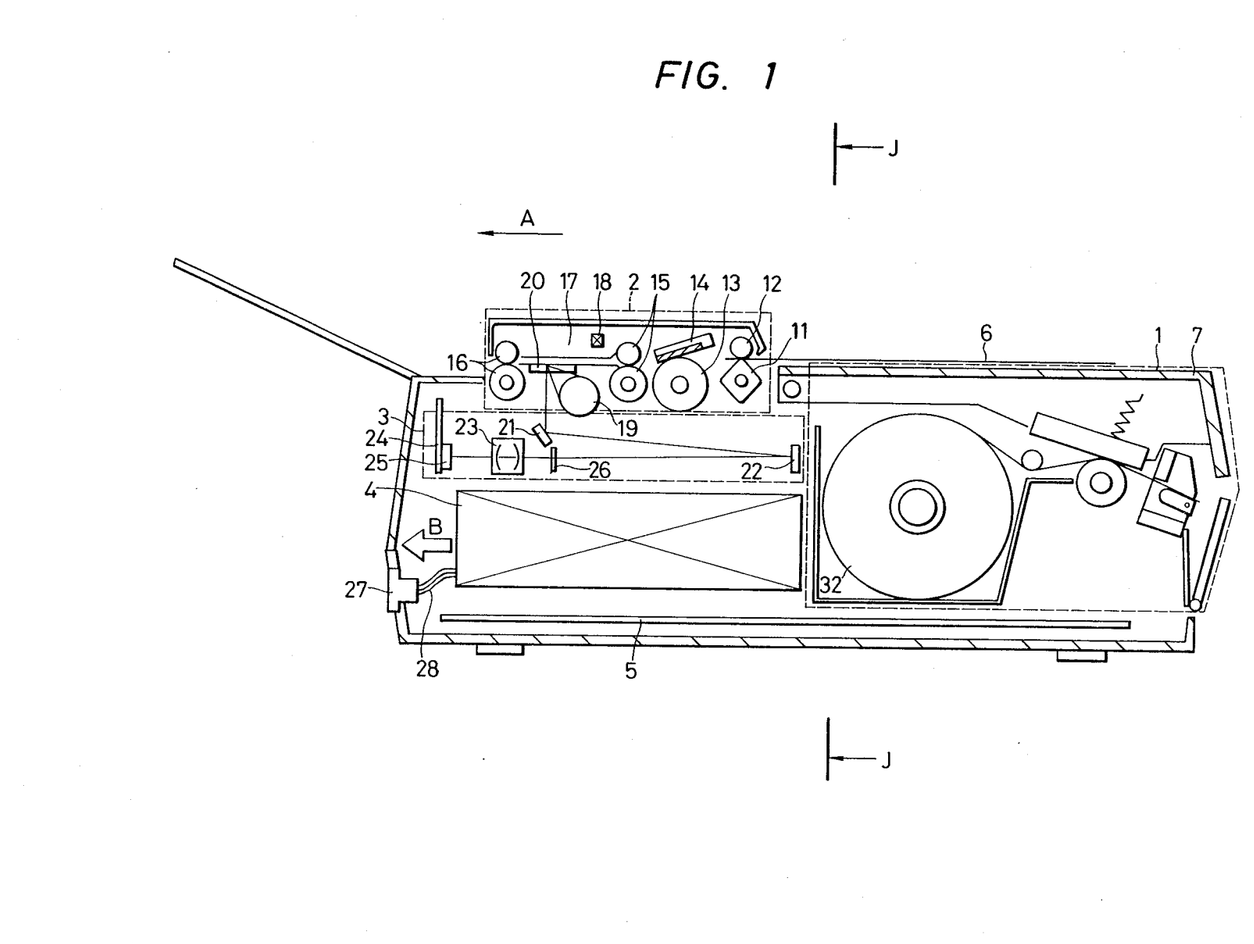
FIG. 1 is a schematic vertical cross sectional diagram showing one embodiment of a whole facsimile apparatus to which the present invention was applied.
Figure 2:
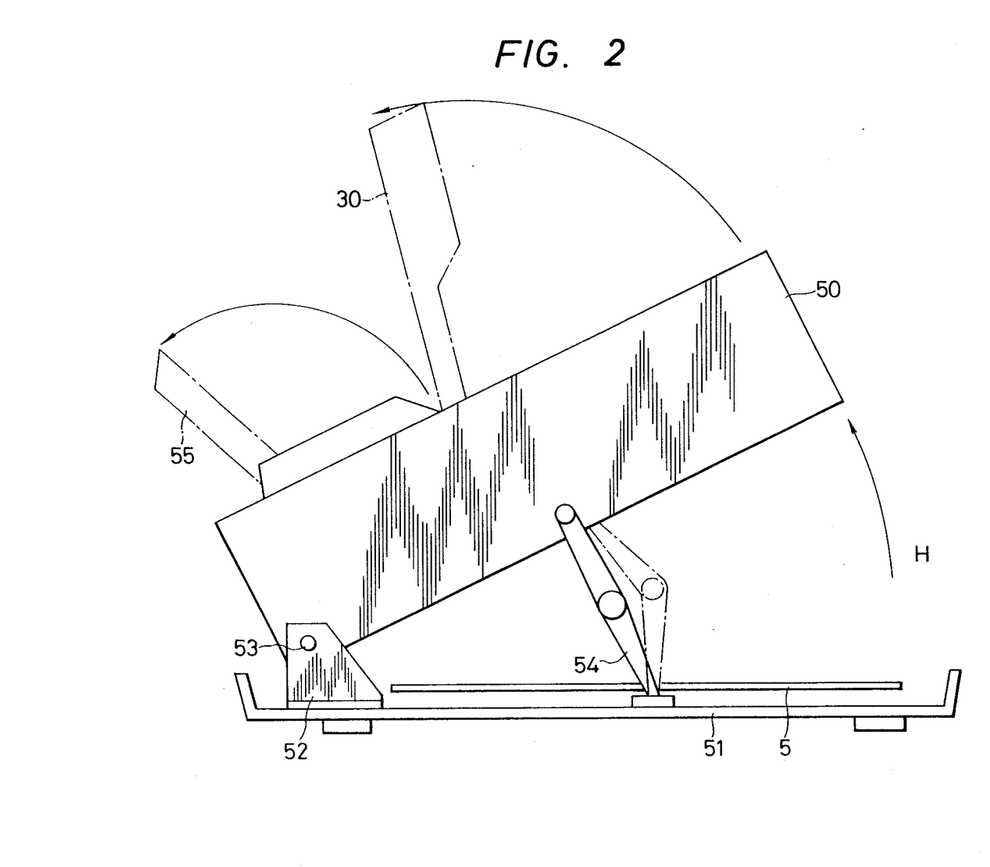
FIG. 2 is a diagram to explain the state whereby the upper casing was moved and opened upward.

FIG. 1 shows a schematic cross sectional view of the main part of the apparatus of this invention and FIG. 2 shows a diagram to explain the state in that an upper casing was moved upward.

The outline of the constitution of this apparatus will now be explained with reference to FIG. 1.

In the diagram, a unit indicated by a reference numeral 1 denotes a recording mechanism system, wherein a roll material 32 for recording is enclosed and this roll material 32 is carried while being printed and recorded, and the roll material is cut and enclosed in a tray.

A unit indicated by a numeral 2 represents an original feeding mechanism system, wherein a plurality of sheets of originals are automatically separated and fed one by one and the originals are led to the reading position, then they are discharged to the outside of the apparatus.

A unit indicated by a numeral 3 denotes a reading optical system, wherein the original which is being fed is illuminated from the lower side thereof and the light reflected therefrom is reflected by a mirror system, and the image information is projected on an image sensor through image forming means, and it is photoelectrically converted.

A unit indicated by a numeral 4 represents a power source of the whole apparatus. Further, a unit indicated by a numeral 5 denotes a system control printed wiring board to control the whole apparatus.

The above-mentioned five units constitute the image processing apparatus and, for example, they are the fundamental functional sections as the facsimile apparatus which were formed as the units. A feature of the apparatus of the present invention is that these respective units are arranged as independent forms so as not to mutually occupy the other unit sections. The units 1 to 4 among the above five units are installed on the side of an upper casing 50, while the unit 5 is installed on the side of a lower casing 51. The power source unit 4 may be installed on the side of the lower casing.

Figure 3:
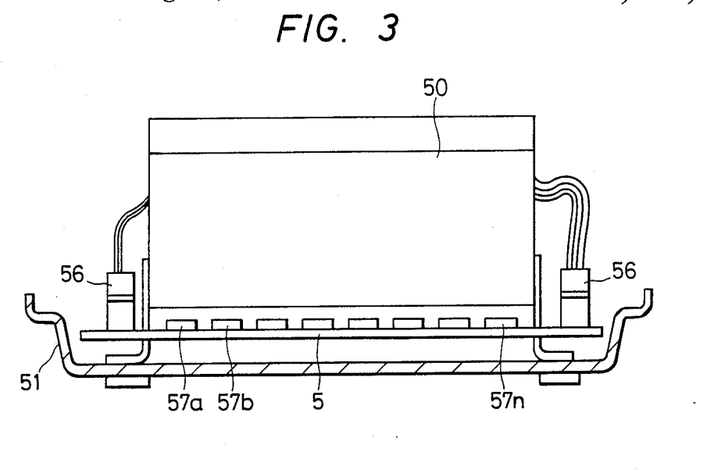
FIG. 3 is a cross sectional view taken along the line J—J in FIG. 1.

In this example, as shown in FIGS. 2 and 3, the upper casing 50 in which the original feeding system unit 2, reading optical system unit 3, power source unit 4, and recording system unit 1 are installed as mentioned above is constituted such that it can be swung and separated upward around a fulcrum 53 of a supporting base 52 which is fixed on the lower casing 51. Also, as shown in FIG. 2, the upper casing 50 is constructed so as to be opened on the operator's side indicated at H. A numeral 54 denotes a stopper in the state whereby the upper casing 50 is open. Since the space can be formed over the system control printed wiring board 5 in this open state, it is possible to easily touch the printed wiring board 5, so that maintenance can be easily performed.

In addition, since a platen roll, a cutter unit tray and the like of the recording system unit 1 are all enclosed in the upper casing 50, a degree of accuracy in the upper casing 50 can be also easily ensured with respect to the flow of the recording paper which is cut by the cutter and enters the tray.

Further, assuming that the operator's side H is set to this side, a recording cover 30 and an upper lid 55 (in which an operation panel is also installed) of the original feeding system unit 2 which will be described later have the structure such that they are opened from this side toward the other side. Also, as will be explained later, the outside wall of the enclosing tray for the recording paper can be brought down on this side; therefore, another feature of the apparatus of this embodiment is that the portions necessary for the ordinary operation and maintenance can be all operated from this side.

FIG. 3 shows a schematic cross sectional view taken along the line J—J in FIG. 1. As will be obvious from FIG. 1, the relation between the upper casing 50 and the printed wiring board 5 is such that the enclosing section of the power source unit and recording material is located over the printed wiring board 5. Therefore, to reduce the height of the apparatus, it is necessary to decrease the distance between them. In this way, in case of making the apparatus thin, it is difficult to install the parts with relatively higher heights, such as, e.g., capacitors and connectors which are installed on the printed wiring board. Therefore, as shown in FIG. 3, the printed wiring board 5 is extended in the regions on the right-hand and left-hand outsides of the upper casing 50 and, for instance, connectors 56 and the like are arranged in these extended regions, while lower parts 57a to 57n and the like are arranged below the upper casing 50. Due to this, the above-mentioned difficulty can be easily solved. In this embodiment, it is possible to provide a thin and compact apparatus without vainly increasing the height thereof due to the above-described idea.

Each section of the apparatus in this embodiment will then be described in detail hereinbelow.

Figure 4A:
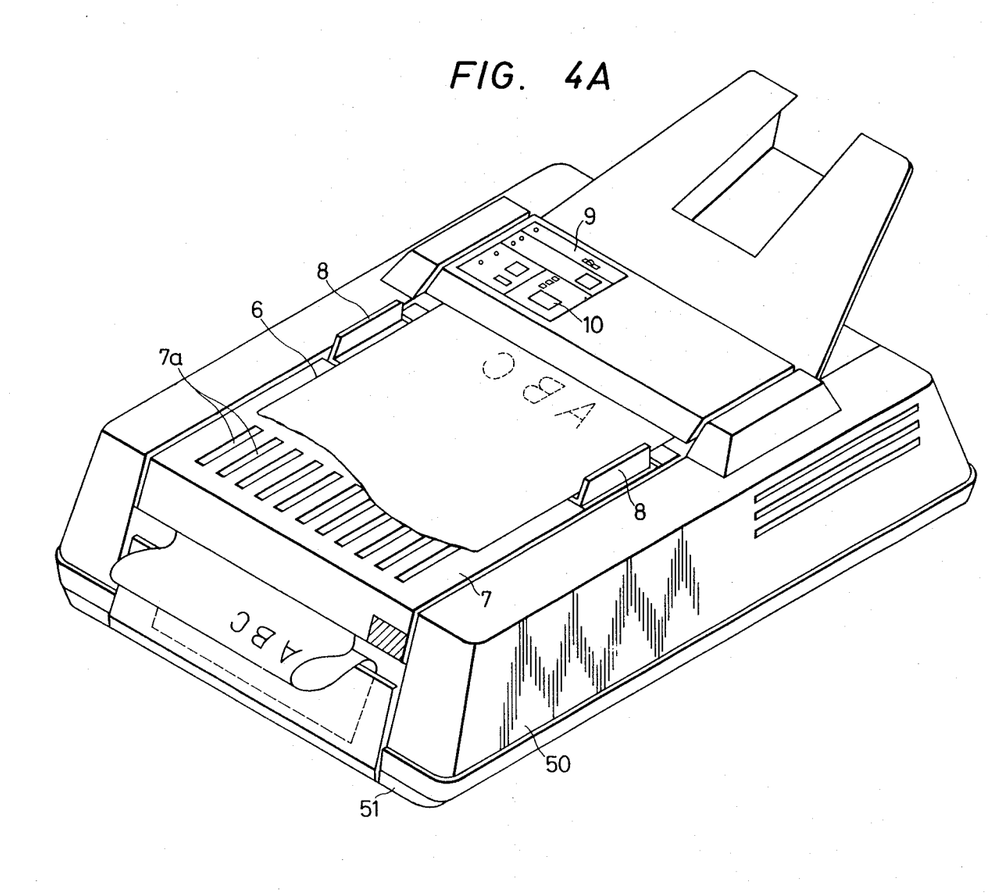
FIG. 4A is an outside perspective view of the apparatus.
Figure 5A:
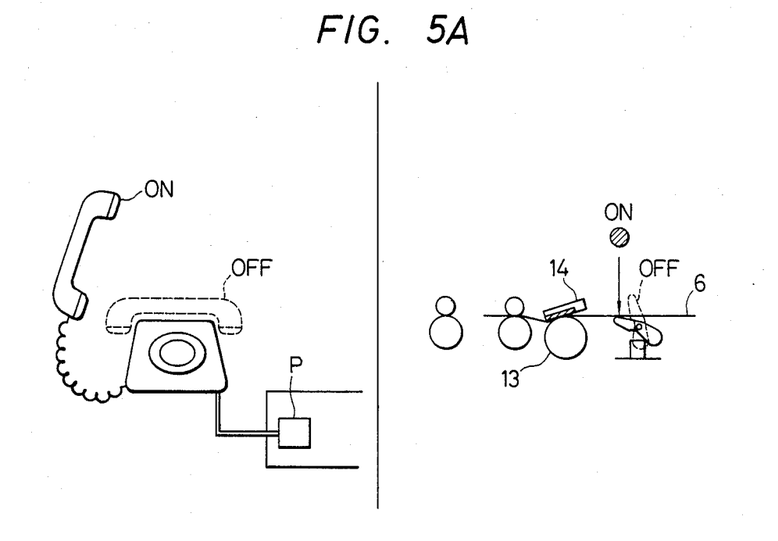
FIGS. 5A and 5B are a diagram and a table to explain the control for the operation mode.
Figure 5B:
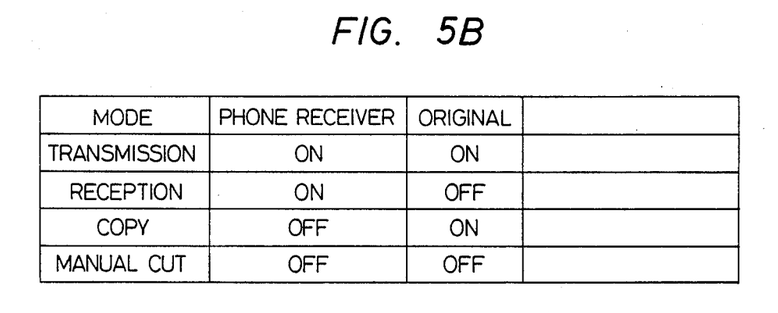

As shown in FIG. 4A, an original 6 which is copied is first placed on an original base 7, which also serves as a cover for the recording mechanism section, with the front side of the original 6 turned over. The edge of the original 6 is inserted in the position near sliders 8. The sliders 8 are the members to maintain the feeding position of the original which can be moved in the lateral direction in accordance with the width size of the original. In addition, a plurality of louvers 7a as the throughholes are formed in the upper and lower surfaces of the original base 7. These louvers 7a can effectively radiate the heat produced by the recording head which will be mentioned later. The depression of a start key 10 on an operation panel 9 in this state allows the copying operation to be started. The controls for each operation mode of the transmission, reception and copy in the apparatus of this embodiment will now be simply explained. As shown in FIGS. 5A and 5B, in the apparatus of this embodiment, the presence and absence of the original are detected by means of a combination of an actuator and a photo interrupter (both are not shown) which are arranged in the original inserting section. Also, the on and off of the phone receiver are detected by use of a hookup detecting relay P provided in the apparatus. As shown in the combinations indicated in a table of FIG. 5B, the control system is constituted in the manner such that: the apparatus is set to the transmission mode when the start key was depressed in the state whereby the phone receiver has been lifted up (on) and the original exists (on); the apparatus is set to the reception mode when the start key was depressed in the state whereby the phone receiver has been lifted up (on) and no original exists (off); and the apparatus is set to the copy mode when the start key is depressed in the state whereby the phone receiver is put on the telephone set (off) and the original exists (on).

When the operator enters the copy mode, drive means (not shown) starts the operation and feeds the original 6 in the direction indicated by an arrow A in FIG. 1. A square roller 11 is a member to intermittently feed the original 6 to separating roller 13 due to the actions of the roller 11 together with a backup roller 12 separating roller 13 being provided on the downstream side of the square roller 11. A separating member 14 is lightly pushed and put on the separating roller 13. Due to the cooperation of separating roller 13 and separating member 14, a plurality of sheets of originals placed are sequentially separated from the lower side one by one and are further sent downstream. The originals are further sent ahead by a carrying roller pair 15 and are then discharged to the outside of the apparatus by a discharge roller pair 16. The portion indicated by a numeral 17 which exists halfway in this carrying passage denotes the original reading position. An original detecting sensor 18 is arranged on the upstream side of the reading position. The top edge and rear edge of the original are detected by this sensor 18, thereby controlling the timings for the start and end of reading.

Next, the reading optical system unit 3 will be discussed. A light source 19 for illumination (a fluorescent lamp is ordinarily used in a facsimile) is located below the reading section 17 and a contact glass 20 is disposed in the reading position. Objects of this glass are to prevent the optical parts such as a mirror and the like from becoming dirty due to dust from the reading position and to prevent pins and clips and the like from dropping.

The light emitted from the light source 19 radiates the original 6 on the contact glass 20. The light reflected by the original is then reflected to the right by a first mirror 21 which is disposed immediately below the reading section and is again reflected to the left by a second mirror 22 which is disposed on the right side in the diagram. This reflected light is formed on an image sensor 25 on a printed board 24 through a lens 23 disposed below the first mirror 21.

A shading plate 26 disposed in front of the lens 23 is used to compensate the unevenness of the illumination distribution in the longitudinal direction of the light source (in the direction perpendicular to the paper surface) and to compensate the ratio of light amount at the central and peripheral portions of the light passed through the lens.

The power source unit 4 has a box shape and is disposed below the optical system. Since the rear side of the power source unit faces the rear side of the apparatus, the heat radiation of the power source unit can be easily performed by constituting the apparatus so that the heat sink for heat radiation is protruded at the rear surface of the apparatus. In addition, since an inlet portion 27 of the power source unit is ordinarily arranged on the rear side of the apparatus, a line 28 on the primary side connecting it with the power source unit can be shortened. Therefore, this arrangement is advantageous with respect to the problem of the line noise on the primary side and the electrical safety standard.

In addition, in this embodiment, since the power source unit 4 is located on the rear side, it can be easily pulled out in the direction indicated by an arrow B in FIG. 1, so that the power source unit can be taken out of the apparatus without removing the other units. Thus, this arrangement is also very advantageous for maintenance.

Figure 6:
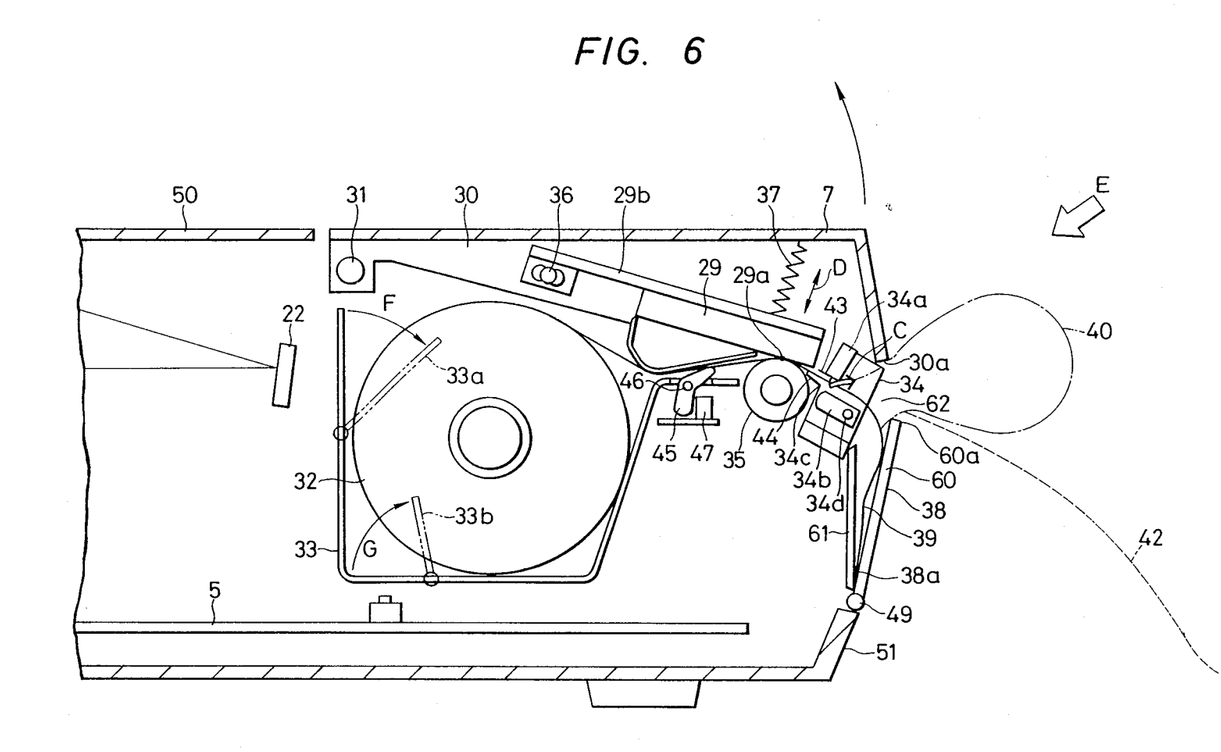
FIG. 6 is a partially enlarged diagram of FIG. 1.

Next, the recording system unit 1 will be explained. FIG. 6 shows an enlarged diagram of the recording system unit 1, in which the closing cover 30 installs a recording head 29 and the original base 7 and the like and also serves as a part of the upper casing. This cover 30 is constituted such that it can be rotated around a fulcrum 31 and is opened and closed for the main body of the upper casing 50. FIG. 6 shows the state in that the closing cover 30 is closed.

The structure to set the roll-like recording sheet 32 and the roll-out carrying passage thereof will then be explained. First of all, the closing cover 30 is opened and the roll is put in an enclosing section 33 which can be opened upward. Then, the roll end of the recording sheet is pulled out and passed on a platen roll 35 and is passed through a gap $34_c$ between a fixed blade $34_a$ and the edge of a movable blade $34_b$ which are provided in a cutter unit 34 and is protruded slightly outside the cutter unit 34. When the start key on the operation panel is depressed with the closing cover closed in this state, the movable blade $34_b$ of the cutter is swung in the direction indicated by an arrow c around a fulcrum $34_d$, thereby cutting the recording sheet. Thereafter, the platen roll 35 is rotated counterclockwise in FIG. 6 through driving means (not shown) and returns the cut edge portion of the recording sheet to the location near an exothermic line portion $29_a$ of the recording head 29, then the platen roll 35 is stopped. In this way, the recording sheet 32 is completely set.

The recording operation such as the reception, copy or the like is started from this state. This operation will then be explained.

When the recording operation is begun, the platen roll 35 is rotated clockwise in FIG. 6, thereby carrying the recording sheet to the side of the cutter 34. At this time, the exothermic line portion $29_a$ of the recording head 29 is pushed on the bus line of the platen roll 35, so that the image information is printed on the recording material due to the cooperation of them.

In addition, the recording head 29 is fixed to a supporting base $29_b$ in this embodiment and the supporting base $29_b$ engaged with a fulcrum 36 is rotatable around the fulcrum 36 in the direction indicated by an arrow D. A pushing spring 37 serves to press the recording head on the side of the platen. The edge of the recording sheet which has been printed and carried is sent through the gap $34_c$ of the cutter 34 and enters a tray 38.

The structure of this tray 38 is novel and is a part of the important constitution of the present invention. This point will be explained later.

The edge of the recording sheet 39 discharged from the gap $34_c$ of the cutter 34 as mentioned above reaches a bottom portion $38_a$ of the tray as indicated by a solid line. When the recording sheet is further continuously advanced and discharged, as indicated by an alternate long and short dash line 40, it is discharged to the outside of the apparatus so as to make a loop as shown in the diagram from the gap formed by a lower end $30_a$ of the recording cover 30 and an upper end $60_a$ of an outer wall 60 of the tray 38. At this time, since the printed surface of the recording sheet can be seen by the eyes from the side of the operator indicated by an arrow E, the user can check that the image information has been printed, so that this contributes to set him at ease.

Figure 4B:
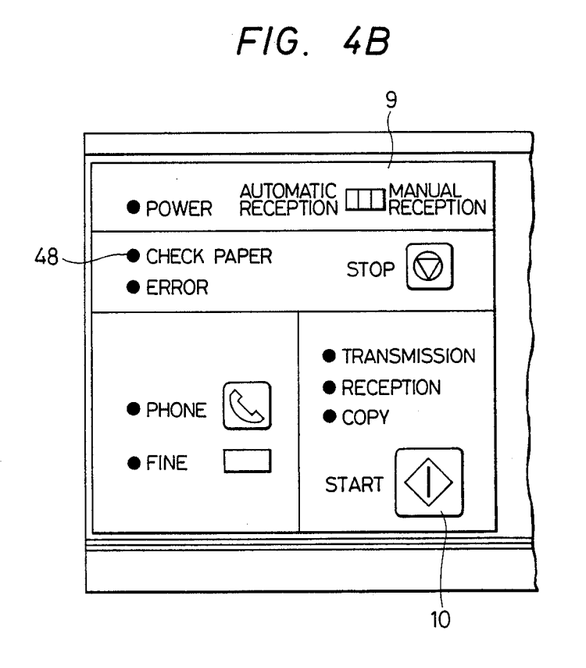
FIG. 4B is an enlarged diagram to explain the operation panel section.

Further, when the carrying of the recording sheet is advanced and the rear end portion of the image information comes to the cutting position, the carrying operation for the recording sheet is stopped and the cutting operation follows. When the rear end of the recording sheet is cut, the rear end of the recording sheet is turned over in the state whereby it is protruded to the outside of the appararus due to the restoring force of the loop of the recording sheet as indicated by a broken line 42. At this time, the top end portion of the recording sheet is held by the bottom portion $38_a$ of the tray. The next recording sheet is put in the tray similarly and is reversely placed on the former recording material. Therefore, when taking out a plurality of recording sheets placed from the tray 38, they are set in the order of pages in accordance with the recording sequence with the printed surfaces placed as the front side. In addition, reference numerals 43 and 44 denote guide plates which are fixed respectively to the cutter unit and are used to lead the recording sheet to the cutter unit. Also, an actuator 45 detects the presence and absence of the recording sheet and the opening and closure of the recording cover 30 and is rotatable around a fulcrum 46. For instance, as shown in the diagram, in the state whereby the recording sheet is normally set in position and the recording cover 30 is closed, the actuator is out of a sensor (such as, e.g., a photo interrupter) 47. If no recording sheet exists or the recording cover 30 is opened, the tension of the recording sheet for the actuator 45 will disappear. Thus, the actuator 45 is rotated counterclockwise in the diagram and engages the sensor 47, so that it generates a signal, thereby informing "inspect the recording paper" to the operator by means of, for instance, the lighting of an LED 48 on the operation panel 9 shown in FIG. 4B. Furthermore, the enclosing section 33 for the recording sheet is the region where the operator can easily insert his hand by opening the recording cover 30 located over the enclosing section 33. In this embodiment, a part $33_a$ of the enclosing section 33 can be further rotated in the direction indicated by an arrow F in the state whereby the roll-like recording sheet 32 doesn't exist, so that it is possible to easily perform the maintenance such that dirt on the surface of the second mirror 22 of the optical system is wiped out by inserting the hand from this region, and the like. In addition, by opening a bottom portion $33_b$ of the enclosing section 33 in the direction indicated by an arrow G, it is possible to easily access the adjusting switches on the system control printed wiring board which is located below the enclosing section 33, such as, e.g., the volume to adjust the buzzer sound, the ID number setting switch and the like which will be touched when installation and maintenance are performed.

The sheet material enclosing tray will be described in detail. Assuming that the outer wall member 60 which is substantially a part of the upper casing 50 of the apparatus is the first guide member, the cutter 34 will substantially serve as the sheet discharge outlet portion. Namely, the sheet material enclosing tray 38 in this embodiment is constituted by the first guide member (outer wall) 60 with which the sheet discharged comes into contact and which leads this downward, and a second guide member 61 which faces this first guide member 60 and forms the sheet enclosing space. The second guide member 61 is formed by the plastic plate or the like fixed to a stay (not shown) inside the upper casing 50 of the facsimile apparatus. The lower end of the first guide member 60 is coupled to the lower end of the second guide member by a pin 49. Although these guide members are shown as the plates in the embodiment shown in the diagram, they are not necessarily limited to plate-like forms. For example, the guide members of which a plurality of wires are arranged in the longitudinal direction may be used. After all, the members which can obstruct the movement of the recording sheet and can guide this in the enclosing space may be used.

A click mechanism (not shown) for stopping the first guide member into the state as shown in FIG. 6 is provided between the upper casing 50 of the facsimile apparatus and the first guide member 60. The first guide member 60 is ordinarily held in the closed position and can be opened by being rotated around the pin. When the first guide member is opened, it may be preferably stopped by the above-mentioned stay.

When the first guide member 60 is open, the recording sheet discharged is moved along this first guide member 60, so that the first guide member forms the discharge guide portion at this time. When the recording sheet is too long or contrarily too short, the apparatus may be used in this state whereby the first guide member 60 is open. On the other hand, in the case where a great amount of recording paper is enclosed at once and this amount exceeds the accommodating ability, it is preferable that the click mechanism for stopping the first guide member 60 to the closed state is disposed so that the first guide member 60 can be made opened by automatically cancelling this click mechanism in dependence upon the weight of the recording sheet accommodated.

In the state whereby the first guide member 60 is closed as shown in FIG. 6, a narrow closed portion $38_a$ to sandwich the edge of the sheet which was sent in the downward direction is formed in the lower portion of the sheet material enclosing space which is formed between the first guide member 60 and the second guide member 61. Although the sheet material enclosing space has been formed like a V-character shape and the closed portion $38_a$ has been formed at the bottom thereof in the embodiment shown in the diagram, this is not necessarily limited to the V-character shape but the wall surfaces which are formed by both members at the lower end thereof may be slightly apart from each other. In addition, when the first guide member 60 is closed, the angle formed by the recording sheet and the first guide member 60 may be an obtuse angle so that the recording sheet comes into contact with the first guide member 60 and is smoothly guided downward in the enclosing space.

Further, when the first guide member 60 is in the closed state, an opening portion 62 is formed in the upper end of the first guide member 60. This opening portion 62 permits the turning over of the rear end of the sheet material when the sheet material of the long type was enclosed. That is, as shown in FIG. 6, when the first guide member 60 was closed, the opening portion 62 is formed which is enough large so that the loop-like recording paper 32 indicated by the alternate long and short dash line 40 is discharged between the upper end of the first guide member 60 and the upper casing 50 of the main body 1. Therefore, when the top end of the recording sheet is led into the wedge-shaped enclosing space of the enclosing tray 38 and this top end is sandwiched by the bottom portion of the enclosing space, and at the same time the rear end portion of the recording sheet which is continuously fed is cut by the cutter. Due to this, the rear end of the recording sheet is turned over and sent to the outside of the apparatus due to the actions of both of the springy force of the paper and the rotational force of the blade of the cutter. Thus, the top end of the recording sheet is kept sandwiched in the apparatus, while the rear end of the recording sheet is hung down in the outside of the apparatus. The accommodation is completed in this state and the operation is continued to enclose the next recording sheet.

In the above-mentioned sheet material enclosing tray, if the distance from the closed portion $38_a$ for sandwiching the top end of the recording sheet to the cutter (or the roller or other final discharging means) is set to be shorter than the length in the ordinary feeding direction of, for instance, the standard recording sheet which is used, namely, than the length of the recording sheet of, e.g., the A4 size, it is possible to certainly accommodate a number of recording papers in the tray in the state whereby the top end of the recording sheet is held by the closed portion $38_a$ and the rear end is hung down in the outside of the apparatus. With such a constitution, a number of long-type sheet materials can be held in the enclosing tray which does not project from the image processing apparatus and they can be also easily taken out. In addition, since the sheet materials are held in the tray in the state whereby they were turned over respectively in such a constitution, the operation to put the pages in order which was needed in the conventional tray falls into disuse.

The effects of the apparatus of this embodiment will be summarized as follows.

(1) A carrying trouble such as jamming or the like hardly occurs since the original is horizontally carried, so that high reliable sheet feeding can be assured.

(2) Since the originals are carried with the front side turned over, the pages of the originals discharged are put in order.

(3) Since the halfway of the carrying passage for the original and recording sheet can be opened and closed, it is possible to easily perform the processing for jamming if it should happen when the sheet is carried. In addition, the partial transmission which is sent in the halfway of the carrying direction can be easily performed.

(4) Since the printed surface of the recording sheet is discharged as the front side, it can be easily confirmed at the time of reception. Also, after that the recording sheets are turned over and accommodated in the tray, their pages are put in order.

(5) The recording sheet enclosing tray is substantially built in the upper casing, so that no vain projection exists and the apparatus is compact.

(6) The recording system unit is located on this side of the operation side, so that the roll paper can be easily installed by opening the cover.

(7) Since the cover of the recording system unit is also commonly used as the original base, the apparatus is compact.

(8) As shown in FIG. 1, since the respective functional sections are distinctly separated, each functional section can be handled as a unit, so that the productivity is excellent. In addition, there is less dead space and the space is efficiently utilized.

(9) Since the power source unit is located on the rear side of the apparatus, the heat radiation can be easily done by constituting the apparatus such that the radiating fins are protruded on the rear side. At the same time, since the distance from the power source inlet (which is ordinarily provided on the rear side) to the power source unit is short, influences such as the line noise and the like can be reduced.

(10) The above-mentioned respective functional sections are integrally installed on the side plate and this can be freely opened and closed, so that the space where the hand can be easily inserted is formed over the system control printed wiring board and maintenance can be easily performed.

(11) The height of the apparatus is determined by (diameter of the roll paper)+(height of the system control printed wiring board including the parts installed)+α, so that the apparatus can be constituted as a relatively thin type.

In addition, the apparatus has a structure such that the printed wiring board is extended on both sides of the chassis and the parts of large heights are installed on these extended portions, so that the gap between the printed wiring board and the chassis can be made small and a thin apparatus can be realized. At the same time, parts such as the connectors can be attached and removed without lifting the apparatus.

(12) The recording sheet enclosing tray is disposed on the side of the side plate so that it can be freely opened and closed, so that a high degree of positional accuracy with the cutter and the like can be easily secured.

(13) The height dimensions of the apparatus can be minimized by arranging in the outside of the side plates the connectors of large heights which are attached on the printed wiring boards. In addition, the connectors and the like can be easily attached and removed without lifting the apparatus.

(14) The recording head is located in the upper portion and the louvers are formed in the upper recording cover portion, so that the heat of the recording head can be effectively radiated with this arrangement.

As is obvious from the above description, according to the present invention, the main mechanism sections which constitute the apparatus are formed as the units and for these respective units, the layout is determined in consideration of the maintenance and productivity and the structure depending upon this layout is adopted. Therefore, the whole apparatus can be compactly constituted, and at the same time it is possible to obtain the image processing apparatus in which the maintenance is easy and the productivity efficiency is excellent.

Further, the enclosing section for the roll-like recording paper is provided below the closing cover which also serves as the base to mount the original, and the closing member to access on the side of the reading optical system is provided in this enclosing section. Therefore, the maintenance of the reading optical system which is located inside the apparatus can be performed without removing other members. In addition, the recording mechanism unit, original feeding mechanism unit, and the other main mechanism units are installed on the chassis. The corner section on the downstream side of the original feeding direction of this chassis is rotatably attached to the side of the bottom plate of the apparatus. Therefore, maintenance can be performed by opening the chassis from the operator's side which is the front side of the apparatus.

In addition, the cover which also serves as the original base and the operation panel section which is provided to cover the original feeding mechanism unit are provided for the chassis so that they can be freely rotated around the downstream side in the original feeding direction as the fulcrum. Therefore, processing when original jamming occurs and operations such as the partial advance of the original and the like can be executed from the front side of the apparatus (from the operator's side).

Moreover, the recording head is provided on the backside of the cover which can be opened and closed and also serves as the base to place the original thereon, and the louvers as the holes for heat radiation are formed in this cover. Therefore, the heat of the recording head can be directly radiated toward the outside atmosphere and the heat radiation can be efficiently performed in spite of the fact that the apparatus is extremely compact and that the size thereof is limited.

On the other hand, the printed wiring board which is disposed below the chassis is extended on both sides of the chassis and the electronic parts of large heights are installed on these extended portions. Therefore, the distance between the chassis and the printed board can be made as small as possible irrespective of the heights of the electronic parts. Thus, it is possible to obtain the compact image processing apparatus in which the height of the whole apparatus is remarkably shortened.

Further, according to such a sheet material enclosing tray, if the distance from the closed portion to sandwich the top end of the sheet material which is discharged from the discharge outlet to the cutter or roller which is located at the discharge outlet portion or to the other final discharge means is set to be shorter than the ordinary length in the feeding direction of the standard sheet material which is generally used, for example, than the length of the sheet material of the A4 size, the top end of the sheet material will be held by the closed portion and the rear end thereof will be hung down to the outside of the apparatus. In this state, a number of sheet materials can be certainly enclosed in the tray. Also, this tray is not largely protruded to the outside of the main body of the apparatus, and at the same time the height of the whole tray can be set to a value within a range of the height of the main body of the apparatus. Such a compact tray can be installed in the main body of the apparatus in this way, so that it is very effective from the viewpoint of miniaturization of the tray.

In addition, since the tray is constructed as described above, it can be preferably coupled to the main body of the image processing apparatus, so that it is effective for the miniaturization of the apparatus in case of including the corresponding relation therebetween also, and for improvement in assembling accuracy. Further, it is effective to simplify the works for maintenance and inspection.

What is claimed is:

1. An image processing apparatus comprising:
   a recording system unit for recording;
   an enclosing member for enclosing recording material and a recording head for recording on the recording material, said enclosing member and said recording head being arranged in said recording system unit;
   a placing section for placing an original thereon;
   an original feeding system unit, arranged on a downstream side of said placing section in a direction in which the original is fed, for feeding the original; and
   a reading optical system unit, arranged below said original feeding system unit, for reading image information from the original,
   wherein said placing section is arranged over at least said enclosing member and horizontally receives the original thereon and wherein said placing section can be freely opened and closed independently of said original feeding system unit and said reading optical system unit.

2. An apparatus according to claim 1, further comprising a power source unit, arranged below said reading optical system unit, for supplying electric power; and a wiring unit, arranged below said power source unit and said recording system unit, for wiring electrical circuits.

3. An apparatus according to claim 2, wherein said recording head is supported so as to freely approach and move away from recording paper supplied from said enclosing member as the roll-like recording material.

4. An apparatus according to claim 2, wherein said original feeding system unit is supported so as to freely approach and move away from said reading optical system unit.

5. An apparatus according to claim 2, further having a supporting member for supporting said recording system unit, said original feeding system unit, said reading optical system unit, and said power source unit, and wherein said supporting member is supported so as to freely approach and move away from said wiring unit.

6. An apparatus according to claim 2, further having a supporting member for supporting said recording sytem unit, said original feeding system unit, and said reading optical system unit, and wherein said supporting member is supported so as to freely approach and move away from said power source unit and said wiring unit.

7. An apparatus according to claim 2, wherein said recording head is supported so as to freely approach and move away from recording paper supplied from said enclosing member as the roll-like recording material, and said original feeding system unit is supported so as to freely approach and move away from said reading optical system unit, and said recording system unit, said original feeding system unit and said reading optical system unit are supported so a to freely approach and move away from said wiring unit.

8. An apparatus according to claim 2, wherein said recording material consists of a roll-like recording paper.

9. An image processing apparatus comprising:
   a recording system unit for recording;
   an enclosing member for enclosing recording material and a recording head for recording on the recording material, said enclosing member and said recording head being arranged in said recording system unit;
   a placing section for placing an original thereon;
   an original feeding system unit, arranged on a donwstream side of said placing section in a direction in which the original is fed, for feeding the original; and
   a reading optical system unit, arranged below said original feeding system unit, for reading image information from the original,
   wherein said placing section is arranged over at least said enclosing member and horizontally receives the original thereon and wherein said placing section can be freely opened and closed independently of said original feeding system unit and said reading optical system unit, and
   wherein said recording system further comprises a roller for pulling out the recording material from said enclosing member and carrying it, wherein said placing section covers said enclosing member and said roller, and said recording head is arranged under said placing section at a position facing said roller to record on the recording material.

10. An apparatus according to claim 9, wherein said enclosing member is disposed in a section adjacent to said reading optical system unit and said enclosing member has a side wall in which an opening portion is formed at said adjacent section, and wherein a member for rotatably supporting one end of said placing section on the downstream side in the original feeding direction is provided for enabling said placing section to be freely rotated, thereby forming a space which communicates with said reading optical system unit through the side wall of said enclosing member when said placing section is opened.

11. An apparatus according to claim 10, further comprising an opening/closing member for enabling said opening portion formed in said side wall of said enclosing member to be freely opened and closed.

12. An apparatus according to claim 9, wherein a member for rotatably supporting one end of said placing section on a side of said placing section which is the downstream side in the original feeding direction is provided to enable said placing section to be freely rotated, and said placing section supports said recording head attached below it so as to freely approach and move away from said roller.

13. An apparatus according to claim 9, wherein said placing section has a hole portion which penetrates from a lower side to an upper side, thereby enabling air heated due to heat of said recording head to be freely discharged from the lower side to the upper side of said placing section.

14. An image processing apparatus comprising:
a supporting member supporting a recording system unit, an original feeding system unit and a reading optical system unit for image processing;
a wiring unit arranged close to a lower surface of said supporting member and formed so that a width dimension thereof is wider than said lower surface of said supporting member;
a first part arranged close to a side of a bottom surface of said supporting member on said wiring unit; and
a second part arranged close to a side of a side surface of said supporting member on said wiring unit and formed so that a height dimension thereof is higher than said first part.

15. An apparatus according to claim 14, wherein said supporting member is supported so as to freely approach and move away from said wiring unit.

16. An image processing apparatus comprising:
recording means for recording an image on recording material;
enclosing means for enclosing the recording material;
a covering member for covering the recording material set in said enclosing means; and
reading means for reading an original placed on said covering member, wherein said covering member is adapted to be freely opened and shut independently of the reading means and is used further as an original placing member for placing the original thereon.

17. An apparatus according to claim 16, further comprising an electric circuit unit arranged under said enclosing means, wherein after said covering member is opened and said recording material in said enclosing means is removed, said electric circuit unit under said enclosing means can be adjusted.

18. An apparatus according to claim 17, further comprising an original feeding means arranged at a downstream portion of said covering member and original reading means arranged under said original feeding means, wherein, after said feeding means is opened and the recording material in said enclosing means is removed, said original reading means can be cleaned.

* * * * *

UNITED STATES PATENT AND TRADEMARK OFFICE
CERTIFICATE OF CORRECTION

PATENT NO. : 4,768,100
DATED : August 30, 1988
INVENTOR(S) : TOSHIAKI KUNISHIMA, ET AL.

It is certified that error appears in the above-identified patent and that said Letters Patent is hereby corrected as shown below:

COLUMN 1

Line 10, "arranged," should read --arranged--.
Line 43, "keeps" should read --keep--.
Line 60, "of" (second occurrence) should be deleted.
Line 61, "the" (first occurrence) should be deleted.

COLUMN 2

Line 1, "the" (second occurrence) should be deleted.

COLUMN 4

Line 52, "backup roller 12" should read --backup roller 12, the--.

COLUMN 6

Line 49, "appararus" should read --apparatus--.

COLUMN 8

Line 32, "enough large" should read --large enough--.

COLUMN 11

Line 23, "works" should read --work--.

UNITED STATES PATENT AND TRADEMARK OFFICE
CERTIFICATE OF CORRECTION

PATENT NO. : 4,768,100

DATED : August 30, 1988

INVENTOR(S) : TOSHIAKI KUNISHIMA, ET AL.

It is certified that error appears in the above-identified patent and that said Letters Patent is hereby corrected as shown below:

COLUMN 12

Line 16, "a" should read --as--.
    Line 29, "donw-" should read --down---.

Signed and Sealed this

Fourteenth Day of February, 1989

Attest:

DONALD J. QUIGG

Attesting Officer      Commissioner of Patents and Trademarks